3,174,543
METHOD OF RECOVERING OIL BY IN-SITU PRODUCED CARBON DIOXIDE
Lorld G. Sharp, Irving, Tex., assignor to Socony Mobil Oil Company, Inc., a corporation of New York
No Drawing. Filed Feb. 23, 1961, Ser. No. 90,914
2 Claims. (Cl. 166—11)

This invention relates to a miscible phase displacement type of secondary recovery of oil from a subterranean reservoir. More specifically, this invention relates to a method of recovering oil wherein the oil is displaced from a reservoir by a gaseous phase which is developed within the reservoir, the major portion of the gaseous phase comprising carbon dioxide.

Subsequent to the completion of one or more wells extending into a subterranean reservoir, oil is normally recovered from the reservoir through the wells by utilization of native reservoir energy, which may exist in several forms, including gas and water drive. The methods of oil recovery which employ native reservoir energy generally are referred to as primary recovery. Primary recovery may be carried out until substantially all of the native reservoir energy has been depleted, at which time no further oil will flow from the reservoir through the wells, or, primary recovery may be employed only until a certain economic limit of production has been reached. Under the most ideal conditions, primary recovery results in the production of only a portion of the oil existing within a reservoir, leaving the remaining oil to be recovered by other methods. When all of the oil recoverable by primary recovery methods has been obtained or when the primary recovery methods have reached an economic production limit, it is common practice to apply what are generally referred to as secondary recovery methods in an effort to increase the maximum production of oil from a reservoir.

Numerous different approaches have been taken to the problem of secondary recovery of oil, including miscible phase displacement and in-situ combustion.

In miscible phase displacement of oil, a gaseous or liquid phase which is miscible with reservoir oil is established within a reservoir where it functions to displace oil from the reservoir. In some cases a fluid phase which is miscible with the reservoir oil is first established within the reservoir and this phase is then forced through the reservoir by means of a driving fluid which may include water, natural gas, or flue gas. The fluid phase displaces the reservoir oil and the driving fluid displaces the fluid phase. One fluid which has been suggested and employed as a miscible phase displacement fluid is carbon dioxide. In one form, carbon dioxide has been introduced into formations as a pure gas for the purpose of displacing reservoir oil. In another form, carbon dioxide has been mixed with a gas such as methane and the mixture introduced into a reservoir for the purpose of displacing oil. Also, it has been known to carbonate liquids which were employed for the purpose of displacing oil from a reservoir. In the practice, however, of the previously suggested methods of employing carbon dioxide as a miscible phase displacement material, the carbon dioxide has been introduced into the formation from the surface and, consequently, it was necessary to have on hand an adequate supply of carbon dioxide.

In-situ combustion processes are generally carried out by initiating combustion or burning of reservoir materials in the presence of an oxidizing medium such as air, with the resultant displacing of oil from a reservoir. Inherent in the conventional in-situ combustion process is the production of a gas, which is normally referred to as flue gas, which gas is composed of carbon dioxide, nitrogen, and carbon monoxide. The flue gas, in which the carbon dioxide is diluted by the nitrogen and the carbon monoxide, has a relatively low efficiency with respect to displacement of reservoir oil. The displacement efficiency of the carbon dioxide in this diluted form is appreciably below the displacement efficiency of substantially pure carbon dioxide which is introduced into the formation as previously suggested.

It is one object of the present invention to provide an improved method of recovering oil from a reservoir. It is another object of the present invention to provide a miscible phase displacement type of secondary recovery of oil from a reservoir. It is a further object of the present invention to provide a miscible phase displacement type of secondary recovery of oil wherein the major portion of the miscible phase is carbon dioxide. It is still a further object of the present invention to provide a miscible phase type method of secondary recovery of oil wherein a miscible phase comprising carbon dioxide is established in situ by oxidation of native reservoir materials.

In accordance with the present invention, oil is recovered from a reservoir by means of steps which include developing within the reservoir a gaseous phase, the major portion of which comprises carbon dioxide, by in-situ oxidation of native reservoir materials, the gaseous phase being miscible with the reservoir oils, introducing a driving fluid into the reservoir which is miscible with the gaseous phase, forcing the driving fluid, the gaseous phase, and the reservoir fluids through the reservoir toward a production well, and producing oil from the reservoir through the production well.

The first step in the process of the invention comprises the development within the reservoir of a gaseous phase which is miscible with the reservoir oils, the major portion of the gaseous phase being carbon dioxide. This gaseous phase is developed in situ within the reservoir by oxidation of the native reservoir materials, the oxidation being carried out by in-situ combustion of, or burning of, the reservoir materials.

While recovery of the type contemplated by the present invention may be carried out by employing a single well penetrating a reservoir, it is normal practice for the reservoir to be penetrated by at least two wells spaced apart one from the other, with one of the wells serving as an injection well while the other serves as a production well through which the reservoir oils are removed from the reservoir. The injection well is equipped with means for heating the reservoir around the injection well to the level required to initiate combustion of the materials within that portion of the reservoir. Any of the well-known mechanisms for initiating combustion may be employed for this purpose. For example, an electrical resistance type heater or igniter, as disclosed in U.S. Patent 2,771,140, issued to Harry A. Barclay et al. on November 20, 1956, may be placed in the injection well adjacent to the portion of the reservoir in which in-situ combustion is to be initiated. The temperature of the reservoir around the injection well is raised by means of the electrical heater to the level required to initiate combustion of the materials within the reservoir. This temperature normally will be approximately 500° F.

When the specified portion of the reservoir extending toward the production well has been heated to ignition temperature, an oxidizing fluid is introduced into the reservoir through the injection well. The oxidizing fluid employed preferably is oxygen with the degree of purity of the oxygen depending upon the degree of purity of the body of $CO_2$ which is to be developed by the in-situ combustion process. The oxidizing fluid introduced to support combustion preferably should be substantially pure oxygen. The oxidizing fluid may, however, contain a minimum of about 66 percent by volume pure oxygen, though the preferred range of pure oxygen content should be from about 95 percent by volume to about 100 percent by volume. For example, in order for the miscible gaseous phase produced by the in-situ combustion process to contain at least 50 percent by volume carbon dioxide, it is necessary that the oxidizing fluid introduced to support combustion comprise at least 66 percent by volume pure oxygen. It is preferred that the miscible gaseous phase developed by the in-situ combustion process contain a minimum of 90 percent by volume pure carbon dioxide, in which case the oxidizing fluid introduced into the injection well must contain at least a minimum of about 95 percent by volume pure oxygen.

Upon entry of the oxidizing fluid into the portion of the reservoir which has been heated to ignition temperature, combustion of the reservoir materials will begin and normally at this point the heating by the electrical heater may be terminated. The process of combustion will produce the desired gaseous phase, with the percentage of carbon dioxide content being dependent upon the percentage of pure oxygen contained in the injected oxidizing fluid. Also, the quantity of the gaseous phase produced will depend upon the quantity of the oxidizing fluid injected. It will also be recognized that as a result of the temperature necessary for combustion, there will be produced within the reservoir a small quantity of cracked or vis-broken hydrocarbons which are less viscous than the reservoir oils being burned. These latter lighter hydrocarbons will, of course, facilitate the miscibility of the carbon dioxide. Also, there will be produced by the combustion process water and trace amounts of carbon monoxide, along with some nitrogen, dependent upon the nitrogen content of the injected oxidizing fluid. It is preferred that the in-situ combustion process be continued until the quantity of the miscible gaseous phase developed is within the range of approximately 2 percent to approximately 20 percent of the hydrocarbon pore volume of the portion of the reservoir which is to be produced by the method of the invention. The term "hydrocarbon pore volume" as used herein shall mean that portion of the pore space of the reservoir occupied by hydrocarbons, gaseous or liquid, as distinguished from that portion of the pore volume which might be occupied by water.

The actual quantity of the oxygen-containing oxidizing fluid which must be injected to develop the desired quantity of miscible gaseous phase may be ascertained by known laboratory procedures. For example, a core sample representative of the formation comprising the reservoir may be saturated with reservoir fluids or with fluids having the characteristics of the reservoir fluids. A pilot in-situ combustion process is then carried out in the core sample, with the results being scaled up by known engineering methods to the magnitude required for the particular reservoir which is to be produced by the process of the invention. Another laboratory method of determining the desired amount of oxygen-containing oxidizing fluid is to saturate a core sample typical of the reservoir formation with fluids having the characteristics of the reservoir fluids and then produce the reservoir fluids by means of a gaseous miscible displacing phase containing the desired amount of pure carbon dioxide. The gaseous phase is then forced through the core sample by means of a driving fluid, which may be water, natural gas, flue gas, or air. It is well known in carrying out such a process that the driving fluid should not come directly in contact with the reservoir fluids, and, consequently, it is necessary that sufficient carbon dioxide be employed to produce a transition zone between the reservoir fluids and the fluid being used to drive the carbon dioxide. In this transition zone, the contents of the fluids extend from high reservoir fluid, low carbon dioxide content to high carbon dioxide content and low reservoir fluid content. In order to prevent direct contact between the driving fluid and the reservoir fluids, it is then necessary that there be a small quantity of pure carbon dioxide immediately behind the fluids which comprise the transition zone itself. In carrying out the test, reservoir fluids are produced from the core sample until the effluent flowing from the sample comprises substantially carbon dioxide. The effluent forming the transition zone is then analyzed to determine its carbon dioxide content, which represents the minimum amount of carbon dioxide necessary to produce the reservoir oil. From this, the amount of oxygen which must be burned in association with the reservoir materials to produce the needed amount of carbon dioxide may be calculated and these results may be scaled to actual reservoir conditions.

An alternative method of carrying out the first step of the invention may be employed and is preferred when conditions are encountered in which the carbon dioxide is not readily miscible directly with the reservoir oil. Phase behavior studies performed in accordance with well-known methods may be carried out in the laboratory to ascertain the miscibility of carbon dioxide with the reservoir oils. If these phase behavior studies reveal that carbon dioxide is readily miscible with the reservoir oils, the first procedure described above for carrying out the first step of the invention is preferred. If, however, it is found that the carbon is not readily miscible with the reservoir oils, it is preferred that the alternative procedure of carrying out the first step of the invention be employed. It has been found that this alternative procedure is preferred in those instances where the viscosity of the reservoir oils is generally above about 10 centipoises at reservoir conditions. In carrying out this alternative procedure, air is injected into the reservoir through the injection well and driven through the reservoir to the production well in order to establish gas permeability. The portion of the reservoir around the injection well is then heated by any suitable means, such as the previously described electrical resistance type heater, until combustion is initiated within the reservoir around the injection well. During the period of heating, air is simultaneously injected into the reservoir, and when the temperature of the reservoir has reached the necessary level, combustion will begin. Combustion is continued through the reservoir around the injection well to a distance of about 10 percent from the injection well to the production well. When combustion has been carried out in this stated portion of the reservoir, the flow of air is terminated and the pressure within the injection well is reduced to a level below that of the reservoir in order to permit backflow of reservoir fluids over the previously heated area toward the injection well. Such backflow will heat reservoir fluids which are flowing from previously unheated zones within the reservoir into the heated zone where the reservoir fluids will be raised in temperature to the degree that they will be cracked or vis-broken to produce a quantity of hydrocarbon fluids which are lighter or lower in viscosity than the native reservoir fluids. Backflow, in the manner described, is continued until trace amounts of the cracked or vis-broken hydrocarbons appear in the injection well. The purpose of the backflow procedure is to create within the reservoir around the injection well a quantity of hydrocarbons lighter than the reservoir oils to provide a buffer zone between the carbon dioxide-containing miscible gaseous phase and unheated reservoir oils. The less viscous hydrocarbons are readily miscible with both the carbon dioxide and the reservoir oil and thus permit the establishment of a transition zone which will allow the carbon dioxide body to miscibly displace the reservoir oil. Since actual combustion was terminated at the initiation of the backflow, the cracking or vis breaking which takes place is accomplished by virtue of the residual heat which is within the formation around the injection well.

When trace amounts of lighter hydrocarbons appear in the injection well, an oxygen-containing oxidizing fluid, as described above in connection with carrying out the first method of accomplishing the first step of the invention, is injected into the reservoir through the injection well. As previously stated, this oxidizing fluid should comprise a minimum of 66 percent by volume pure oxygen and preferably comprises between 95 and 100 percent by volume pure oxygen. Upon entry of the oxidizing fluid into the reservoir, combustion will again occur if the reservoir temperature has remained at a sufficiently high level. If the temperature of the reservoir has been reduced below that required to initiate combustion, it will of course be necessary to reheat the reservoir by means such as an electrical heater in order to re-establish combustion. With combustion again taking place in the presence of the oxidizing fluid, the development of a miscible gaseous phase containing carbon dioxide begins and is continued by continued injection of the oxidizing fluid until the miscible gaseous phase exists in the reservoir in an amount equal to approximately 2 percent to about 20 percent of the hydrocarbon pore volume of the reservoir. The quantity of oxidizing fluid which must be injected is determined in accordance with the previously described procedures.

During the backflow procedure, the cracking and vis breaking which occurs results in the establishment of carbon deposits around the injection well. The burning of these carbon deposits in the presence of the oxygen-containing oxidizing fluid materially contributes to the development of the desired miscible gaseous phase. As previously stated, the greater the percentage of pure oxygen in the oxidizing fluid, the greater will be the percentage of pure carbon dioxide in the miscible gaseous phase developed. When the desired quantity of miscible gaseous phase is produced within the reservoir around the injection well, the injection of the oxidizing fluid is terminated; and, as soon as the oxidizing fluid is consumed by the combustion process, combustion will cease.

In carrying out the above-described procedures comprising the first step of the invention, the pressure within the reservoir should be maintained above about 1000 p.s.i. gauge. This pressure level is approximately the minimum which is required to establish miscibility between carbon dioxide and the reservoir oils. The reservoir pressure may inherently be above this level, in which case the fluids injected in carrying out the first step will of course have to be injected at a pressure above that of the reservoir in order to effect flow into the reservoir through the injection well to carry out the in-situ combustion process. In the event that the reservoir pressure is below this required level, the pressure is raised by injecting the fluids required for the combustion process at a sufficiently high level of pressure.

When the miscible gaseous phase has been established within the reservoir in accordance with the first step of the invention, the second step of the invention may be initiated. The second step comprises the driving of the miscible gaseous phase through the reservoir to displace the reservoir oil. Fluids which may be employed for driving the miscible gaseous phase through the reservoir are natural gas, flue gas, air, or water. The choice of the particular driving fluid to be employed for the purpose of moving the miscible gaseous phase through the reservoir is dependent both upon availability of the fluids which qualify and upon the temperature of the reservoir. The critical temperature of carbon dioxide is 88° F., above which carbon dioxide is a gas at all pressures. Carbon dioxide, therefore, may be miscibly driven by any gas at any pressure or by water, provided the temperature of the reservoir is above 88° F. Therefore, above the temperature of 88° F., natural gas, flue gas, air, or water may be employed for the purpose of displacing the miscible gaseous phase through the reservoir toward the production well. In view of the in-situ combustion process carried out in the first step, it is highly unlikely that the temperature of the reservoir will drop below 88° F. However, should such an eventuality occur, either natural gas or water may be employed as the driving fluid. Below this critical temperature of 88° F., natural gas and water are both miscible with the carbon dioxide.

The driving fluid selected is introduced into the reservoir through the injection well at a pressure of at least 1000 p.s.i. gauge, which pressure must be sufficiently above the reservoir pressure to effect a pressure differential between the injection well and the production well sufficient in magnitude to effect displacement of the miscible gaseous body through the reservoir along with the displaced reservoir oils toward the production well. With the driving fluid moving into the reservoir through the injection well, the gaseous phase is driven through the reservoir toward the production well. As the gaseous phase moves through the reservoir, it displaces the reservoir oil substantially entirely and drives it toward the production well and from the reservoir upwardly to the surface through the production well. The flow of driving fluid is continued into the reservoir through the injection well until substantially all of the displaceable reservoir oil has been produced from the formation through the production well. Flow of the driving fluid into the reservoir is continued until the effluent flowing from the production well substantially comprises the driving fluid or at least until an economic limit has been reached in the ratio between the displacing mediums and the oil being produced from the reservoir. When it is determined that either all of the producible oil has been removed from the reservoir or an economic limit of production has been reached, the process of the invention is complete and the injection of the driving fluid may be terminated.

It will be readily recognized that in carrying out the present invention there is inherent to the process of combustion the formation of a certain amount of water which may be referred to as the water of combustion. Such water, while not essential to the process of the invention, is beneficial in that it improves both the vertical and horizontal sweep efficiencies of the process. This improvement results from the selective plugging effect of the water where zones of high permeability are encountered. The water tends to slow down the movement of the front of the displacing mediums to provide more efficient and more nearly complete removal of the reservoir oil.

While the invention has been described in the light of certain specific embodiments disclosed herein, it is to be understood that the invention is limited only within the scope of the appended claims.

What is claimed is:

1. In a method of recovering oil from a reservoir the steps which comprise:
   introducing air into said reservoir through an injection well and forcing said air through said reservoir to a production well to establish gas permeability within said reservoir;
   heating said reservoir around said injection well to a temperature sufficient to initiate combustion of the native reservoir materials while simultaneously continuing the introduction of air into said reservoir, said combustion being continued through approximately 10 percent of the distance from said injection well toward a production well;
   terminating the flow of air into said reservoir;
   reducing the pressure within said injection well to a value below the pressure within said reservoir to effect backflow of fluids from the unheated portion of said reservoir into the heated portion of said reservoir toward said injection well;
   continuing said backflow until trace amounts of hydrocarbons less viscous than said oil appear in said injection well;

introducing into said reservoir through said injection well an oxidizing fluid comprising at least 66 percent by volume pure oxygen;

reinitiating combustion within said reservoir in the presence of said oxidizing fluid;

continuing said reinitiated combustion to develop an oil-miscible gaseous phase equal in quantity to from about 2 percent to about 20 percent of the hydrocarbon pore volume of said reservoir;

terminating the introduction of said oxidizing fluid and said combustion;

introducing a driving fluid into said reservoir through said injection well to force said gaseous phase through said reservoir to displace said oil; and producing said oil from said reservoir through said production well.

2. The method of claim 1 wherein said oxidizing fluid comprises at least about 95 percent by volume pure oxygen.

References Cited in the file of this patent
UNITED STATES PATENTS

| | | |
|---|---|---|
| 2,788,071 | Pelzer | Apr. 9, 1957 |
| 2,803,305 | Behning et al. | Aug. 20, 1957 |
| 2,862,557 | Utenhove et al. | Dec. 2, 1958 |
| 2,954,218 | Dew et al. | Sept. 27, 1960 |
| 3,062,282 | Schleicher | Nov. 6, 1962 |
| 3,072,185 | Bond et al. | Jan. 8, 1963 |